(12) United States Patent
Lin et al.

(10) Patent No.: US 8,107,040 B2
(45) Date of Patent: Jan. 31, 2012

(54) TRANSFLECTIVE LIQUID CRYSTAL DISPLAY PANEL, LIQUID CRYSTAL DISPLAY MODULE AND LIQUID CRYSTAL DISPLAY THEREOF

(75) Inventors: Chao-Lien Lin, Tainan (TW); Ting-Yi Wu, Tainan (TW); Yi-Chin Lee, Tainan (TW)

(73) Assignee: Chimei Innolux Corporation, Miao-li County (TW)

( * ) Notice: Subject to any disclaimer, the term of this patent is extended or adjusted under 35 U.S.C. 154(b) by 158 days.

(21) Appl. No.: 12/711,722

(22) Filed: Feb. 24, 2010

(65) Prior Publication Data

US 2010/0157214 A1 Jun. 24, 2010

Related U.S. Application Data

(62) Division of application No. 11/944,521, filed on Nov. 23, 2007, now abandoned.

(30) Foreign Application Priority Data

Nov. 24, 2006 (TW) .................................. 95143644 A (51) Int. Cl.
*G02F 1/1335* (2006.01)
(52) U.S. Cl. ........................................................ 349/114
(58) Field of Classification Search .................... 349/114
See application file for complete search history.

(56) References Cited

U.S. PATENT DOCUMENTS

| 5,408,252 | A | 4/1995 | Oki et al. |
| 6,028,650 | A | 2/2000 | Kuroha et al. |
| 6,806,929 | B2 | 10/2004 | Chen et al. |
| 7,084,942 | B2 * | 8/2006 | Luo ................................ 349/114 |
| 7,119,761 | B2 | 10/2006 | Shen et al. |
| 7,248,316 | B2 | 7/2007 | Park |
| 7,379,138 | B2 | 5/2008 | Tung et al. |
| 2005/0030271 | A1 | 2/2005 | Liu |
| 2006/0012614 | A1 | 1/2006 | Asao et al. |
| 2008/0088774 | A1 * | 4/2008 | Fan Jiang et al. ............. 349/114 |

FOREIGN PATENT DOCUMENTS

| TW | 200402575 | 2/2004 |
| TW | 594630 B | 6/2004 |
| TW | 200527043 | 8/2005 |
| TW | 200628907 | 8/2006 |

OTHER PUBLICATIONS

Taiwanese Office Action for application No. 095143644, mailed Feb. 15, 2011.

* cited by examiner

*Primary Examiner* — Mark Robinson
*Assistant Examiner* — Michael Inadomi
(74) *Attorney, Agent, or Firm* — Lowe Hauptman Ham & Berner LLP (57) ABSTRACT

A transflective LCD panel includes scan lines, data lines, transmissive pixels and reflective pixels. Each transmissive pixel is configured to receive a transmissive pixel voltage transmitted from one of the data lines and displays a first gray level related to the transmissive pixel voltage. Each reflective pixel receives a reflective pixel voltage transmitted from one of the data lines and displays a second gray level related to the reflective pixel voltage. When the transmissive pixel and the reflective pixel are used to display a same gray level, the transmissive pixel voltage and the reflective pixel voltage are predetermined such that corresponding first and second gray levels substantially equal each other.

9 Claims, 5 Drawing Sheets

TRANSFLECTIVE LIQUID CRYSTAL DISPLAY PANEL, LIQUID CRYSTAL DISPLAY MODULE AND LIQUID CRYSTAL DISPLAY THEREOF

RELATED APPLICATIONS

The present application is a divisional application of U.S. application Ser. No. 11/944,521 filed Nov. 23, 2007, and claims priority from Taiwanese Application Number 095143644 filed Nov. 24, 2006, the disclosures of which are hereby incorporated by reference herein in their entirety.

This application claims the benefit of Taiwan application Ser. No. 95143644, filed Nov. 24, 2006, the subject matter of which is incorporated herein by reference in its entirety.

BACKGROUND OF THE INVENTION

1. Field of the Invention

The invention relates in general to a transflective liquid crystal display (LCD), and more particularly to a transflective LCD having a transmissive pixel and a reflective pixel, which are respectively controlled by different pixel voltages.

2. Description of the Related Art

In a conventional transflective liquid crystal display (LCD), such as a vertically-aligned (VA) mode transflective LCD, each pixel has a pixel electrode and a reflective electrode electrically connected to each other. The pixel electrode and the reflective electrode respectively form a transmissive region and a reflective region, and the pixel electrode and the reflective electrode are driven by the same pixel voltage. As for the transmissive region, the pixel voltage influences the transmittance rate of backlight passing through a liquid crystal layer in the transmissive region. As for the reflective region, the pixel voltage influences the transmittance rate of environmental light passing through the liquid crystal layer in the reflective region, it is emitted from an environment light source, incident to the liquid crystal layer and then reflected outward by a reflective layer.

Figure 1:
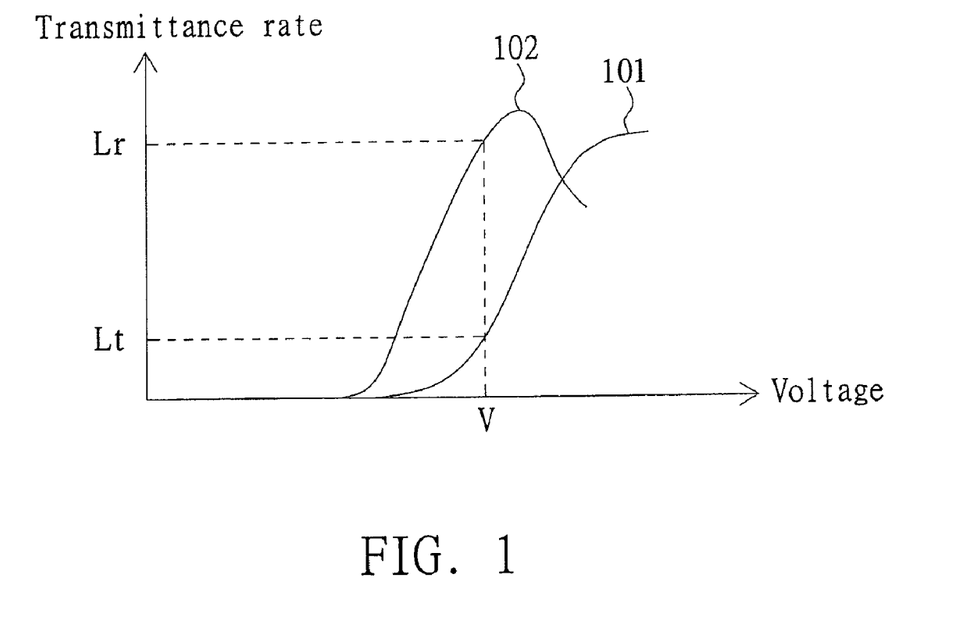
FIG. 1 depicts V-T curves of a transmissive region and a reflective region in a conventional transflective LCD.

The relationship between the pixel voltage and the transmittance rate in the transmissive region, and the relationship between the pixel voltage and the transmittance rate in the reflective region respectively form different voltage-transmission (V-T) curves. Usually, both of the maximum transmittance rates of the V-T curve of the transmissive/reflective region are defined as 100%. FIG. 1 depicts V-T curves of a transmissive region and a reflective region in a conventional transflective LCD.

As shown in FIG. 1, curve 101 is the V-T curve in the transmissive region and curve 102 is the V-T curve in the reflective region. When the pixel voltage is higher than a threshold voltage, the transmissive region and the reflective region start to respectively generate transmittance rate variations. At the same pixel voltage V, the transmittance rate Lt and the transmittance rate Lr, respectively corresponding to the transmissive region and the reflective region are not the same, such that the gray levels of the transmissive region and the reflective region are different from each other and the trends of the two curves are also different from each other. Therefore, in the pixel structure of the conventional transflective LCD, it is difficult for one pixel voltage V to make the transmissive region and the reflective region display the same gray level. Therefore, the transmissive region and the reflective region in one pixel cannot simultaneously reach the desired displaying effect.

For example, one image has to be displayed by four pixels A, B, C and D having different gray levels. However, the same set of pixel voltages are used, so it is impossible to make the transmissive region and the reflective region simultaneously display the four same gray levels. The above-mentioned problem may be solved in the conventional transflective LCD by designing the transmissive region and the reflective region to have different cell gaps (also referred to as a "dual cell gaps"), for example, the cell gap of the reflective region is about one half that of the transmissive region. However, the manufacturing processes are complicated and expensive.

Operationally, the light source of the reflective region comes from the outside environment. When the environmental light source changes, for example, when the light source changes from the outdoor sunlight to the indoor daylight lamp, or when the sunlight changes with time, the brightness and the color presented by the reflective region also change. The color is the result obtained after the light passes through the color filter. However, the light of the transmissive region only comes from the backlight source, and its brightness and color cannot change with the change of the environmental light. Therefore, if the transmissive region and the reflective region are driven by the same pixel voltage, the brightness or colors co-presented by the transmissive region and the reflective region often deviate from the optimum settings, which are set when the product is finished and ready to be shipped out, so that the incongruent condition is obtained when the environmental light changes with the changes of the time and the environment.

Therefore, it is an important subject in the industry to make the displayed gray level generated by the transmissive light the same as the displayed gray level generated by the reflective light in an LCD. It is further important that the brightness and the color representation of the reflective region are not changed with the variation of the environmental light so that the image displaying quality can be enhanced.

SUMMARY OF THE INVENTION

The invention is directed to a transflective LCD having a transmissive pixel and a reflective pixel respectively driven by a transmissive pixel voltage and a reflective pixel voltage. Independently controlling the transmissive pixel and the reflective pixel allows the brightness or the gray level displayed by the transmissive pixel and the reflective pixel to achieve a desired effect, thereby enhancing the image displaying quality.

According to a first aspect of the present invention, a transflective LCD panel including a liquid crystal layer, scan lines, data lines, transmissive pixels and reflective pixels is provided. The data lines are disposed substantially perpendicular to the scan lines. The transmissive pixels include a first transmissive pixel. The first transmissive pixel is controlled by one of the scan lines, receives a transmissive pixel voltage transmitted from one of the data lines to drive a first portion of liquid crystal layer, and displays a first gray level related to the transmissive pixel voltage. The reflective pixels include a first reflective pixel. The first reflective pixel is controlled by one of the scan lines, receives a reflective pixel voltage transmitted from one of the data lines to drive a second portion of liquid crystal layer, and displays a second gray level related to the reflective pixel voltage. When the first transmissive pixel and the first reflective pixel are used to display the same gray level, the received transmissive pixel voltage and the reflective pixel voltage are such that the corresponding first and second gray levels are substantially equal to each other.

According to a second aspect of the present invention, a transflective LCD, including a backlight element, a liquid crystal layer, scan lines, data lines, transmissive pixels and reflective pixels is provided. The backlight element provides a backlight source. The data lines are disposed substantially perpendicular to the scan lines. The transmissive pixels include a first transmissive pixel. The first transmissive pixel is controlled by one of the scan lines, receives a transmissive pixel voltage transmitted from one of the data lines to drive a first portion of liquid crystal layer, and displays a first gray level related to the transmissive pixel voltage. The reflective pixels include a first reflective pixel. The first reflective pixel is controlled by one of the scan lines, receives a reflective pixel voltage transmitted from one of the data lines to drive a second portion of liquid crystal layer, and displays a second gray level related to the reflective pixel voltage. When the first transmissive pixel and the first reflective pixel are used to display the same gray level, the received transmissive pixel voltage and the reflective pixel voltage are such that the corresponding first and second gray levels are substantially equal to each other.

According to a third aspect of the present invention, a transflective LCD module including a liquid crystal layer, scan lines, data lines, at least one driving circuit, a photosensor unit, transmissive pixels and reflective pixels is provided. The driving circuit drives the scan lines and the data lines. The transmissive pixels include a first transmissive pixel. The first transmissive pixel is controlled by one of the scan lines and receives a transmissive pixel voltage transmitted from one of the data lines to drive a first portion of liquid crystal layer. Backlight emitted from a backlight source passes through the first transmissive pixel at a first transmittance rate related to the transmissive pixel voltage. The reflective pixels include a first reflective pixel. The first reflective pixel is controlled by one of the scan lines and receives a reflective pixel voltage transmitted from one of the data lines to drive a second portion of liquid crystal layer. Environmental light is incident to and reflected by the first reflective pixel at a second transmittance rate related to the reflective pixel voltage. The photosensor unit senses a spectrum of the environmental light and is electrically connected to the driving circuit. When the first transmissive pixel and the first reflective pixel are used to display the same original gray level, the driving circuit adjusts the original gray level into an adjusted gray level according to the spectrum sensed by the photosensor unit, and generates the reflective pixel voltage according to the adjusted gray level, such that the first transmissive pixel and the first reflective pixel respectively generate the same brightness.

According to a fourth aspect of the present invention, a transflective LCD includes a backlight element, a liquid crystal layer, scan lines, data lines, at least one driving circuit, a photosensor unit, transmissive pixels and reflective pixels. The backlight element is for providing a backlight source. The driving circuit is for driving the scan lines and the data lines. The transmissive pixels include a first transmissive pixel. The first transmissive pixel is controlled by one of the scan lines, and receives a transmissive pixel voltage transmitted from one of the data lines to drive a first portion of liquid crystal layer. Backlight emitted from the backlight source passes through the first transmissive pixel at a first transmittance rate related to the transmissive pixel voltage. The reflective pixels include a first reflective pixel. The first reflective pixel is controlled by one of the scan lines, and receives a reflective pixel voltage transmitted from one of the data lines to drive a second portion of liquid crystal layer. Environmental light is incident to and reflected by the first reflective pixel at a second transmittance rate related to the reflective pixel voltage. The photosensor unit senses a spectrum of the environmental light, and is electrically connected to the driving circuit. When the first transmissive pixel and the first reflective pixel are used to display the same original gray level, the driving circuit adjusts the original gray level into an adjusted gray level according to the spectrum sensed by the photosensor unit, and generates the reflective pixel voltage according to the adjusted gray level such that the first transmissive pixel and the first reflective pixel respectively generate the same brightness.

According to a fifth aspect of the present invention, a transflective LCD panel includes a liquid crystal layer, scan lines, data lines, transmissive pixels and reflective pixels. The transmissive pixels include a first transmissive pixel. The first transmissive pixel is controlled by one of the scan lines and receives a transmissive pixel voltage transmitted from one of the data lines to drive a first portion of liquid crystal layer. Backlight emitted from a backlight source passes through the first transmissive pixel at a first transmittance rate related to the transmissive pixel voltage. The reflective pixels include a first reflective pixel. The first reflective pixel is controlled by one of the scan lines and receives a reflective pixel voltage transmitted from one of the data lines to drive a second portion of liquid crystal layer. Environmental light is incident to and reflected by the first reflective pixel at a second transmittance rate related to the reflective pixel voltage. A resolution of the transmissive pixels is unequal to a resolution of the reflective pixels.

According to a sixth aspect of the present invention, a transflective LCD includes at least one backlight element, a liquid crystal layer, scan lines, data lines, transmissive pixels and reflective pixels. The backlight element provides a backlight source. The transmissive pixels include a first transmissive pixel. The first transmissive pixel is controlled by one of the scan lines and receives a transmissive pixel voltage transmitted from one of the data lines to drive a first portion of liquid crystal layer. Backlight emitted from the backlight source passes through the first transmissive pixel at a first transmittance rate related to the transmissive pixel voltage. The reflective pixels include a first reflective pixel. The first reflective pixel is controlled by one of the scan lines and receives a reflective pixel voltage transmitted from one of the data lines to drive a second portion of liquid crystal layer. Environmental light is incident to and reflected by the first reflective pixel at a second transmittance rate related to the reflective pixel voltage. A resolution of the transmissive pixels is unequal to a resolution of the reflective pixels.

According to a seventh aspect of the present invention, a transflective LCD panel includes scan lines, data lines, a first liquid crystal layer, a second liquid crystal layer, transmissive pixels and reflective pixels. The transmissive pixels include a first transmissive pixel. The first transmissive pixel is controlled by one of the scan lines and receives a transmissive pixel voltage transmitted from one of the data lines to drive the first liquid crystal layer. The reflective pixels include a first reflective pixel. The first reflective pixel is controlled by one of the scan lines and receives a reflective pixel voltage transmitted from one of the data lines to drive the second liquid crystal layer. The liquid crystal molecules of the first liquid crystal layer and the liquid crystal molecules of the second liquid crystal layer pertain to different aligned modes.

According to an eighth aspect of the present invention, a transflective LCD includes a backlight element, scan lines, data lines, a first liquid crystal layer, a second liquid crystal layer, transmissive pixels and reflective pixels. The backlight element provides a backlight source. The transmissive pixels include a first transmissive pixel. The first transmissive pixel is controlled by one of the scan lines and receives a transmissive pixel voltage transmitted from one of the data lines to drive the first liquid crystal layer. The reflective pixels include a first reflective pixel. The first reflective pixel is controlled by one of the scan lines and receives a reflective pixel voltage transmitted from one of the data lines to drive the second liquid crystal layer. The liquid crystal molecules of the first liquid crystal layer and the liquid crystal molecules of the second liquid crystal layer pertain to different aligned modes.

According to a ninth aspect of the present invention, a transflective LCD panel for generating a frame in a frame time is provided. The transflective LCD panel includes scan lines, data lines, transmissive pixels and reflective pixels. Each transmissive pixel is controlled by one of the scan lines and receives transmissive pixel voltages transmitted from one of the data lines. Several colors of backlight, sequentially emitted from a backlight source, sequentially pass through each transmissive pixel to make each transmissive pixel sequentially display several colors in the frame time. Each reflective pixel is controlled by one of the scan lines and receives a reflective pixel voltage transmitted from one of the data lines. Environmental light is reflected by a first reflective pixel.

According to a tenth aspect of the present invention, a transflective LCD for generating a frame in a frame time is provided. The transflective LCD includes a backlight element, scan lines, data lines, transmissive pixels and reflective pixels. The backlight element provides a backlight source. Each transmissive pixel is controlled by one of the scan lines and receives transmissive pixel voltages transmitted from one of the data lines. Several colors of backlight, sequentially emitted from the backlight source, sequentially pass through each transmissive pixel to make each transmissive pixel sequentially display several colors in the frame time. Each reflective pixel is controlled by one of the scan lines, and receives a reflective pixel voltage transmitted from one of the data lines. Environmental light is reflected by a first reflective pixel.

The invention will become apparent from the following detailed description of the preferred but non-limiting embodiments. The following description is made with reference to the accompanying drawings.

DETAILED DESCRIPTION OF THE INVENTION

In a transflective LCD panel and the display thereof, a transmissive pixel and a reflective pixel are respectively driven by a transmissive pixel voltage and a reflective pixel voltage so that the transmissive pixel and the reflective pixel are controlled independently, attaining simultaneously, the desired effect of brightness displayed by the transmissive pixel and the brightness displayed by the reflective pixel, thereby enhancing the image displaying quality. Thus, the problems of conventional transflective LCD panels, in which the transmissive region and the reflective region of the same pixel are only controlled by the same pixel voltage, such that the transmissive region and the reflective region cannot simultaneously provide a quality display effect, may be solved.

First Embodiment

Figure 2:
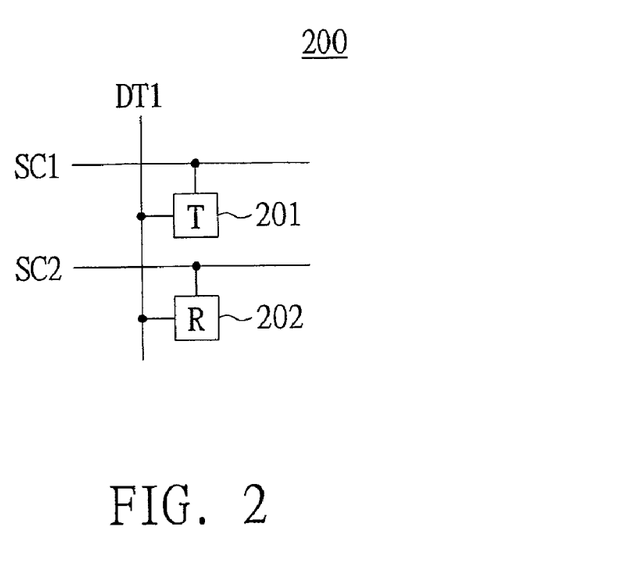
FIG. 2 is a partial schematic depicting a transflective LCD panel according to a first embodiment of the invention.

FIG. 2 is a partial schematic illustrating transflective LCD panel 200 according to a first embodiment of the invention. Transflective LCD panel 200 includes a plurality of scan lines, a plurality of data lines, a plurality of transmissive pixels 201 (represented by "T"), and a plurality of reflective pixels 202 (represented by "R"). Referring to FIG. 2, it shows scan lines SC1 and SC2, a data line DT1, a transmissive pixel 201 and a reflective pixel 202 of the transflective LCD panel 200. The transmissive pixel 201 is controlled by the scan line SC1 and receives the transmissive pixel voltage transmitted from the data line DT1. The backlight emitted from a backlight source passes through the transmissive pixel 201 at a transmittance rate related to the transmissive pixel voltage. The reflective pixel 202 is controlled by the scan line SC2, and receives the reflective pixel voltage transmitted from the data line DT1. The input timings and sequence of the transmissive pixel voltage of the transmissive pixel 201 and the reflective pixel voltage of the reflective pixel 202 are controlled by the switching timings of the scan lines SC1 and SC2. The environmental light emitted from an environmental light source passes through the reflective pixel 202 at a transmittance rate related to the reflective pixel voltage. The transmissive pixel 201 and the reflective pixel 202 are respectively driven by the transmissive pixel voltage and the reflective pixel voltage. Accordingly, when the transmissive pixel 201 and the reflective pixel 202 are used to display the same gray level, the proper transmissive pixel voltage and the proper reflective pixel voltage are respectively inputted such that the transmittance rate of the transmissive pixel 201 and the transmittance rate of the reflective pixel 202 are substantially equal to each other.

Figure 3:
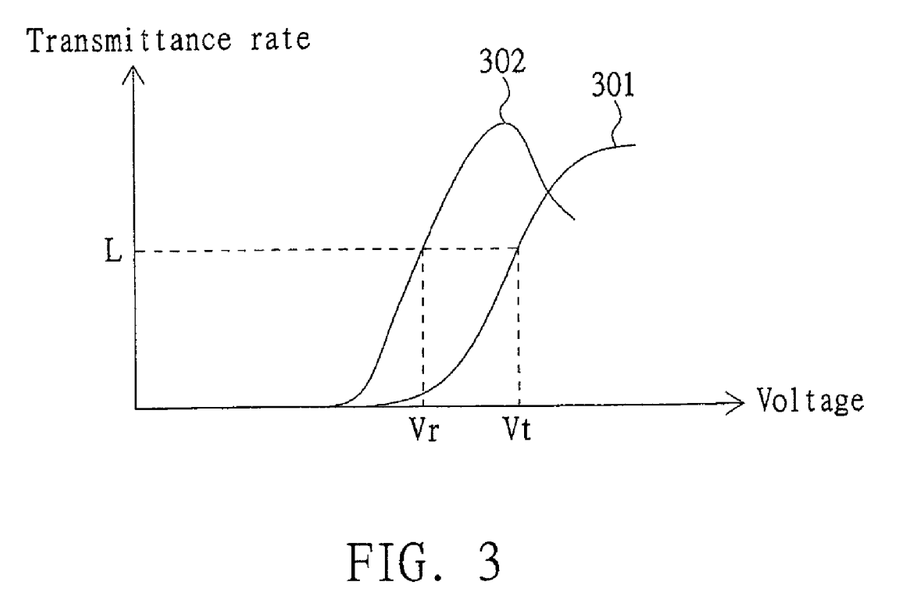
FIG. 3 depicts V-T curves of a transmissive pixel and a reflective pixel in the transflective LCD panel according to the first embodiment of the invention.

FIG. 3 shows V-T curves of the transmissive pixel 201 and the reflective pixel 202 in the transflective LCD panel of FIG. 2. In detail, the curve 301 is a V-T curve of the transmissive pixel 201, the curve 302 is a V-T curve of the reflective pixel 202. When the transmissive pixel voltage or the reflective pixel voltage is greater than a threshold voltage, not shown, the transmissive pixel 201 or the reflective pixel 202 starts to generate a transmittance rate variation. When the transmissive pixel 201 and the reflective pixel 202 are used to display the same gray level, the transmissive pixel voltage Vt and the reflective pixel voltage Vr are respectively inputted such that the transmittance rate of the transmissive pixel 201 and the transmittance rate of the reflective pixel 202 are equal to transmittance rate L, corresponding to the same gray level, that is, the transmissive pixel 201 and the reflective pixel 202 can display the same gray level L. In general, the gray level corresponds to the transmittance rate, that is, the maximum gray level (i.e., 255) corresponds to the maximum transmittance rate 100% and vice versa for the minimum gray level.

In addition, the transflective LCD panel 200 of this embodiment has a single cell gap.

In the transmissive pixel 201 and the reflective pixel 202 of the transflective LCD panel 200 according to the first embodiment of FIG. 2, the transmissive pixel 201 and the reflective pixel 202 respectively receive the transmissive pixel voltage and the reflective pixel voltage through the same data line DT1, and the transmissive pixel 201 and the reflective pixel 202 are driven by different scan lines SC1 and SC2. Non-limiting, the transmissive pixel 201 and the reflective pixel 202 may also receive the transmissive pixel voltage and the reflective pixel voltage through different data lines, and the transmissive pixel 201 and the reflective pixel 202 may also be controlled by the same scan line. Any transflective LCD panel having the transmissive pixel and the reflective pixel, which are driven by the independently generated transmissive pixel voltage and reflective pixel voltage, is deemed as falling within the scope of this embodiment.

Figure 4:
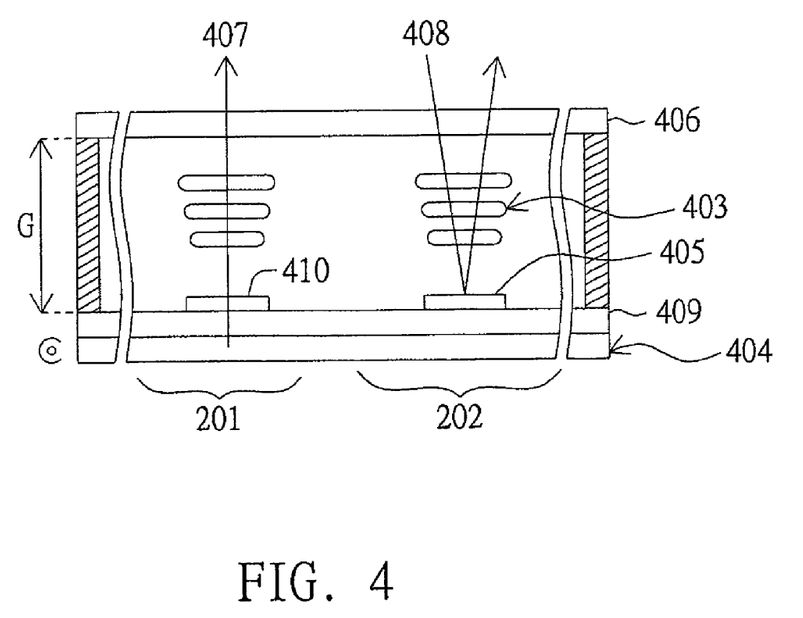
FIG. 4 is a side view depicting structures of the transmissive pixel and the reflective pixel in the transflective LCD of the transflective LCD panel of FIG. 2.

FIG. 4 is a side view illustrating structures of the transmissive pixel 201 and the reflective pixel 202 in the transflective LCD of the transflective LCD panel of FIG. 2. A single cell gap G exists between an upper substrate 406 and a lower substrate 409 of the transflective LCD. A liquid crystal layer 403 is disposed between the upper substrate 406 and the lower substrate 409. The transmissive pixel voltage received by the transmissive pixel 201 is transmitted to a pixel electrode 410 to change the orientation of the liquid crystal molecules of the liquid crystal layer 403 of the transmissive pixel 201. Thus, the transmissive pixel 201 displays a first gray level after a backlight beam 407, emitted from a backlight element 404, passes through the liquid crystal layer 403.

Regarding reflective pixel 202, the reflective pixel voltage received by the reflective pixel 202 is transmitted to a reflective electrode 405 to change the orientation of the liquid crystal molecules of the liquid crystal layer 403 of the reflective pixel 202. An environmental light beam 408 emitted from an environmental light source is reflected by the reflective electrode 405 such that the reflective pixel 202 displays a second gray level, which is substantially equal to the first gray level.

When the transmissive pixel and the reflective pixel are desired to display a specific gray-scale distribution (e.g., four transmissive pixels and four reflective pixels are to display four gray levels A>B>C>D), the four transmissive pixels and the four reflective pixels will not display different sets of four gray levels, such as A>B>C>D and E<F>G>H, which would make the frame data disordered and deteriorates the displaying quality. In addition, this embodiment is distinguished from the prior art, it uses a single cell gap instead of a dual cell gap. Furthermore, this embodiment requires simpler manufacturing processes enabling a reduction in manufacturing costs.

Second Embodiment

Figure 5:
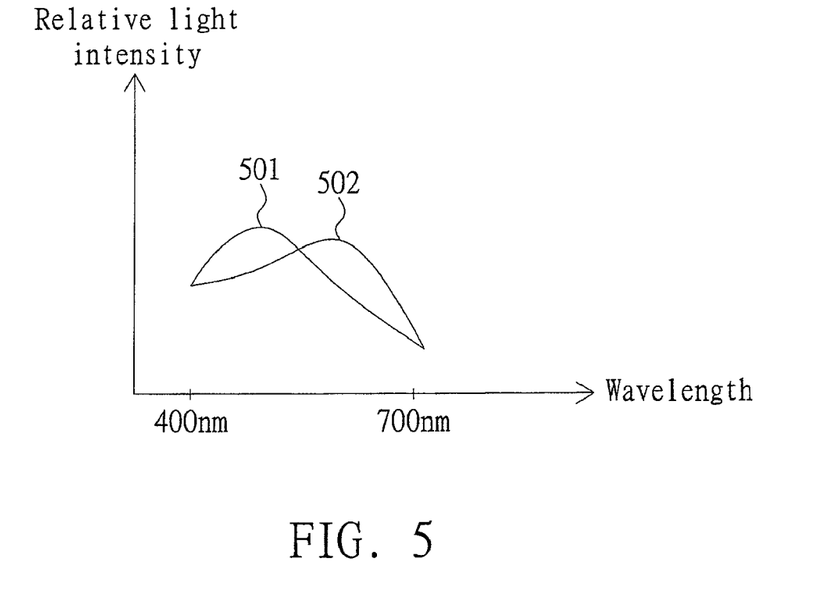
FIG. 5 depicts spectrums of environmental light and backlight.

The light for the reflective pixel comes from the environmental light and the light for the transmissive pixel comes from the backlight, so the spectrums of the environmental light and the backlight are usually different, as illustrated in the spectrums of FIG. 5. A spectrum 501 is a backlight spectrum and a spectrum 502 is an environmental light spectrum wherein spectrum 502 changes with a change of the spatiotemporal environment.

With regard to the transmissive pixel and the reflective pixel needing to simultaneously display the same gray level, the displayed brightness of the transmissive pixel is substantially different from the displayed brightness of the reflective pixel because the light source spectrums of the transmissive pixel and the reflective pixel are different from each other. Consequently, some specific black-and-white brightness or color, which is to be displayed in the frame, is influenced by the environmental light of the reflective pixel and is thus distorted. Further, the spectrum of the environmental light changes with the spatiotemporal environment, making the problem of color or brightness distortion more serious.

Figure 6:
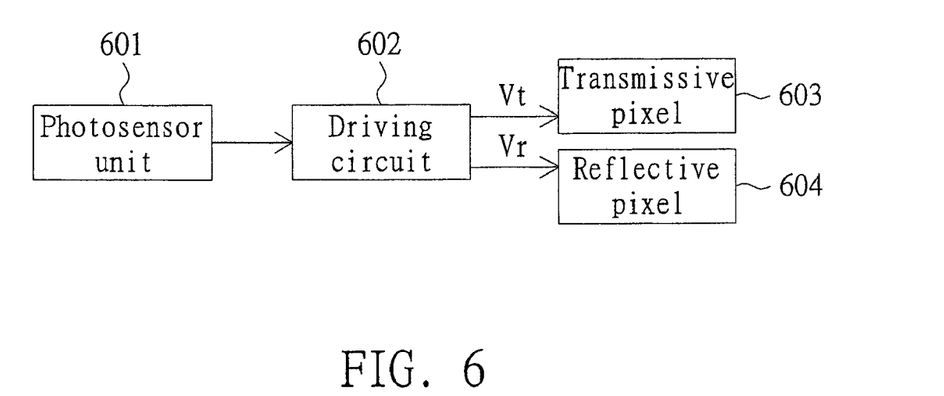
FIG. 6 depicts a block diagram of a transflective LCD module according to a second embodiment of the invention.

FIG. 6 is a block diagram illustrating a transflective LCD module according to a second embodiment of the invention, wherein a transmissive pixel 603 receives a transmissive pixel voltage Vt outputted from a driving circuit 602, and the backlight, emitted from a backlight source, passes through the transmissive pixel 603 at a transmittance rate related to the transmissive pixel voltage Vt. A reflective pixel 604 receives the reflective pixel voltage Vr outputted from the driving circuit 602, and the environmental light emitted from the environmental light source passes through the reflective pixel 604 at a transmittance rate related to the reflective pixel voltage Vr.

This embodiment is distinguished from the first embodiment in that the transflective LCD module of the second embodiment has a photosensor unit 601, which is electrically connected to a driving circuit 602. This driving circuit includes a data driver, a scan driver and a timing controller. The photosensor unit 601 senses a spectrum of the environmental light emitted from the environmental light source. The driving circuit 602 adjusts the original gray level corresponding to the reflective pixel 604 into a corrected gray level according to a compared result between the spectrum sensed by photosensor unit 601 and the spectrum of the backlight source so that a same brightness as that of the transmissive pixel 603 can be displayed, and the voltage for controlling the reflective pixel can be generated according to the adjusted gray level. Consequently, when the transmissive pixel 603 and the reflective pixel 604 simultaneously display the brightness corresponding to the original gray level, the displayed brightness of the transmissive pixel 603 and the displayed brightness of the reflective pixel 604 can be made substantially equal to each other by generating the transmissive pixel voltage Vt corresponding to the original gray level and by generating the reflective pixel voltage Vr corresponding to the adjusted gray level.

In the transflective LCD module according to the second embodiment of the embodiment, the photosensor unit 601 senses the spectrum of the environmental light to adjust the gray level displayed by the reflective pixel 604. Thus, not only can the transmissive pixel and the reflective pixel display the same gray level in a manner similar to that of the first embodiment, but further the substantially same brightness can also be displayed. For example, when the environmental light spectrum of the environment of the transflective LCD module changes, e.g., when the environmental light changes from indoor light to sunlight, the transflective LCD module of this embodiment still can reduce the difference between the images displayed by the reflective pixel and the transmissive pixel and particularly improve elimination of differences between the colors displayed by the two pixels.

A transflective LCD is further provided that includes a backlight element and the transflective LCD module of the second embodiment. The backlight element provides the backlight and is disposed in a same manner as that of the transflective LCD according to the first embodiment illustrated in FIG. 4.

Third Embodiment

Figure 7:
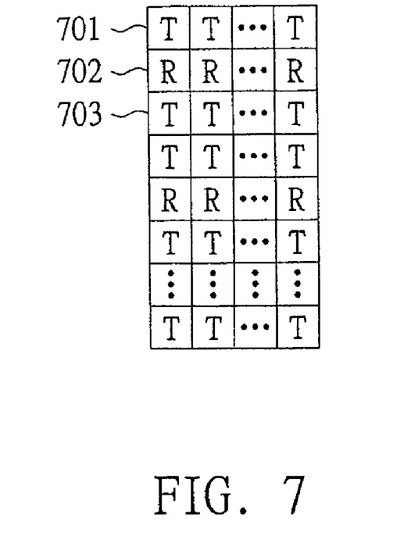
FIG. 7 depicts a transflective LCD panel according to a third embodiment of the invention.

FIG. 7 illustrates a transflective LCD panel according to a third embodiment of the invention. The LCD panel illustrated in FIG. 7 is distinguished from that of the first embodiment in that the LCD panel of the third embodiment has a number of transmissive pixels T and a number of reflective pixels R, and the resolution of the transmissive pixels is unequal to the resolution of the reflective pixels. The transmissive pixels form a number of transmissive pixel rows including, for example, transmissive pixel rows 701 and 703. The reflective pixels form reflective pixel rows including, for example, reflective pixel row 702.

The transmissive pixel T receives the transmissive pixel voltage transmitted from the data line. The backlight emitted from a backlight source passes through the transmissive pixel at a transmittance rate related to the transmissive pixel voltage. The reflective pixel R receives the reflective pixel voltage transmitted from the data line. The environmental light emitted from an environmental light source passes through the reflective pixel at a transmittance rate related to the reflective pixel voltage. The number of the transmissive pixels of this embodiment is preferably greater than that of the reflective pixels, and the number of the transmissive pixel rows is preferably greater than that of the reflective pixel rows. The ratio of the number of the transmissive pixel rows to the number of the reflective pixel rows in FIG. 7 is 2:1. Consequently, the scan signals scan the transmissive pixels and the reflective pixel rows at a scan frequency ratio of 2:1.

Such a design enables the reflective pixels to be applied to applications, such as time annunciation, ticker annunciation, and the like, in which a mobile telephone or other types of displays can display frames |simply|, and the display resolution needs not to be too high. At this time, it is capable to skip scanning the transmissive pixel rows, and only scan the reflective pixel rows. Furthermore, this kind of display mode has a lower demand on brightness or color, so the requirement can be fulfilled by designing the reflective pixel rows, which use the environmental light source as the light source, to be the pixel rows with the lower resolution. Compared with the first embodiment, this embodiment can decrease power consumption and achieve a power-saving effect by greatly reducing the times of scanning the transmissive pixel rows|.

In this embodiment, the ratio of the number of the transmissive pixel rows to the number of the reflective pixel rows is approximately 2:1. In practice, a different ratio can be adopted, and the resolutions of the transmissive pixels and the reflective pixels can be adjusted by any other method. For example, the number of the reflective pixel rows can be decreased to achieve a power-saving effect. Any transflective LCD panel capable of achieving the power-saving effect by adjusting the resolution of the transmissive pixels and the resolution of the reflective pixels falls within the scope of this embodiment.

The invention further provides a transflective LCD that includes a backlight element and the transflective LCD panel of the third embodiment. The backlight element provides the backlight, and the backlight element is disposed in a manner similar to that of the transflective LCD, according to the first embodiment illustrated in FIG. 4.

Fourth Embodiment

Figure 8:
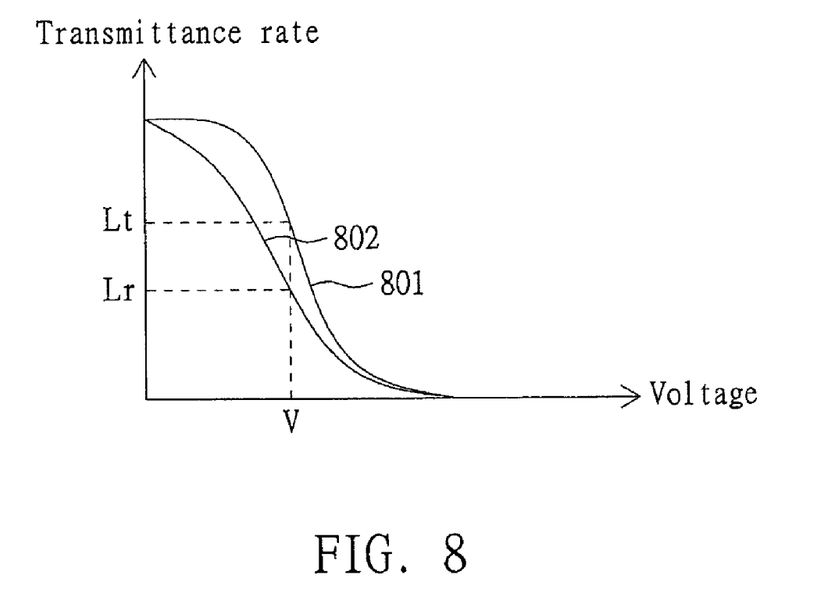
FIG. 8 depicts V-T curves of a transmissive pixel and a reflective pixel in a transflective LCD panel according to a fourth embodiment of the invention.

FIG. 8 shows V-T curves of a transmissive pixel and a reflective pixel in a transflective LCD panel according to a fourth embodiment of the invention. As shown in FIG. 8, curve 801 is a V-T curve for the transmissive pixel, and curve 802 is a V-T curve for the reflective pixel. What is different from the first embodiment is that the fourth embodiment is applied to a multi-mode LCD panel having a plurality of modes, such as a dual-mode display, in which the aligned mode of the liquid crystal layer of the transmissive pixel is a low twist TN mode, and the aligned mode of the liquid crystal layer of the reflective pixel is a hybrid aligned nematic (HAN) mode. The transmissive pixel and the reflective pixel in this dual-mode LCD panel use different liquid crystal aligned modes and thus respectively have different V-T curves, as shown in FIG. 8. Thus, similar to a conventional VA mode transflective LCD panel, this embodiment still has the problem that the display control of both of the transmissive pixel and the reflective pixel cannot be optimized when the pixels are driven by the same pixel voltage.

Figure 9A:
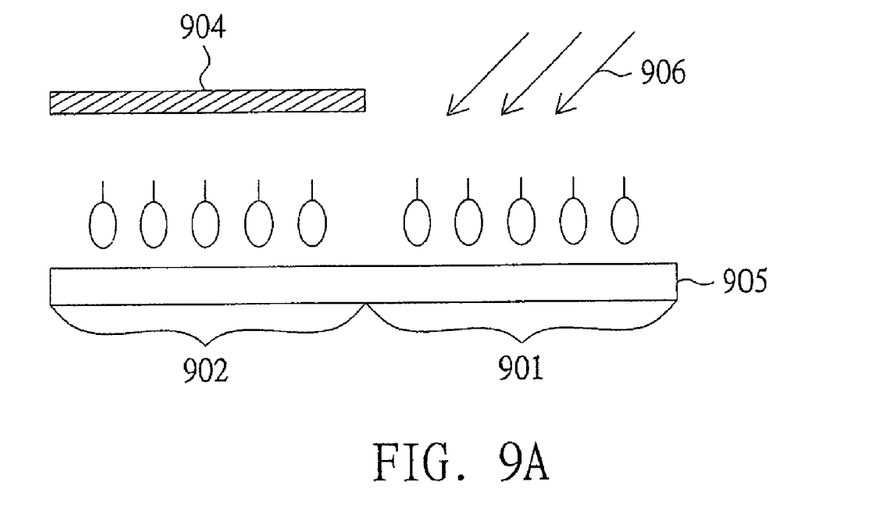
FIGS. 9A and 9B depict processes for different aligned modes of liquid crystal layers.
Figure 9B:
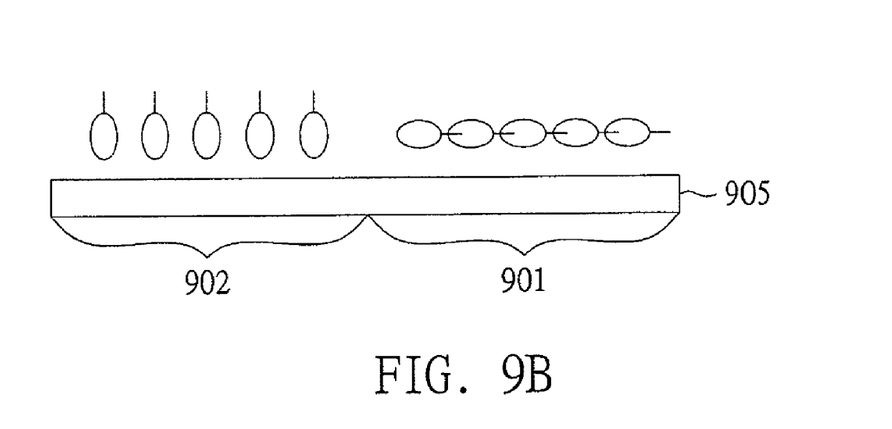

FIGS. 9A and 9B illustrate processes for different aligned modes of liquid crystal layers. In order to obtain the liquid crystal layer of the transmissive pixels and the liquid crystal layer of the reflective pixels, which have different aligned modes, two substrates of the transflective LCD of this embodiment are covered by a vertically aligned film (polyimide, AL-00010). The vertically aligned film of the upper substrate (not shown) is illuminated by an argon ion light beam with 200 electron volts (eV) for 40 seconds. In FIG. 9A, a vertically aligned film 905 of the lower substrate in a transmissive pixel 901 is illuminated by an Argon ion light beam 906 with 200 eV for 40 seconds. In a reflective pixel 902, the vertically aligned film 905 of the lower substrate is covered by a protective film 904 to isolate the argon ion light beam 906. In FIG. 9B, the vertically aligned film 905 of the transmissive pixel 901 is illuminated by the Argon ion light beam 906, and then the aligned mode of the liquid crystal layer of the transmissive pixel 901 becomes the low twist TN mode, while the aligned mode of the liquid crystal layer of the reflective pixel 902 becomes the HAN mode.

This embodiment adopts the pixel design similar to the first embodiment such that the transmissive pixel and the reflective pixel are driven by different pixel voltages to display the same gray level, and therefore, the display control can be optimized.

A transflective LCD is further provided that includes a backlight element and the transflective LCD panel of the fourth embodiment. The backlight element provides the backlight and is disposed in a manner similar to that of the transflective LCD according to the first embodiment of FIG. 4.

Fifth Embodiment

Figure 10:
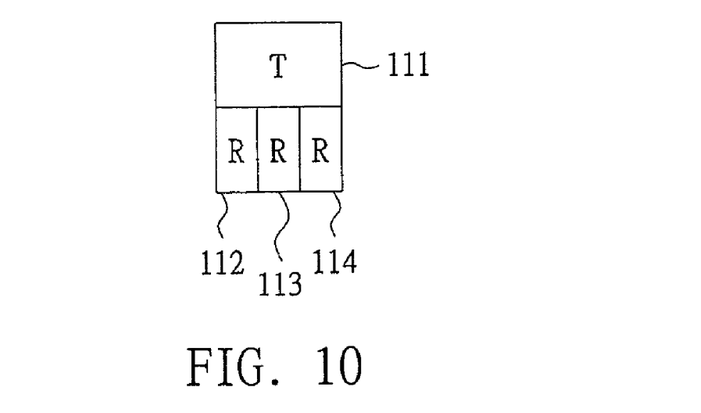
FIG. 10 depicts an arrangement of pixels in the transflective LCD panel according to a fifth embodiment of the invention.

FIG. 10 illustrates an arrangement of pixels in the transflective LCD panel according to a fifth embodiment, wherein three transmissive pixels, each of which having a size the same as that of the reflective pixel and controlled by an individual thin film transistor, are replaced with a transmissive pixel, which has a size three times that of the reflective pixel and is controlled by one thin film transistor so that the aperture rate can be enhanced.

A transmissive pixel 111 sequentially receives a plurality of transmissive pixel voltages, and the backlight emitted from the backlight source passes through the transmissive pixel 111 at a transmittance rates related to the transmissive pixel voltages. Each of reflective pixels 112, 113, and 114 receives one reflective pixel voltage individually, and the environmental light emitted from the environmental light source passes through reflective pixels 112, 113, and 114 at transmittance rates related to the receive reflective pixel voltages.

What is different from the first embodiment is that the transmissive pixel 111 is driven by field sequential color (FSC) technology. In a frame time of generating a frame, the backlight, which is emitted from the backlight source, has several colors sequentially passing through the transmissive pixel 111 without the use of a color filter, so that transmissive pixel 111 sequentially displays several transmissive colors, such as red, green and blue colors, in one frame time. The backlight source includes red, green and blue light emitting diodes (LEDs), which are energized according to a timing sequence. The transmissive pixel voltages are sequentially adjusted |in one frame time |to adjust the transmittance rates when the transmissive pixel is displaying red, green, or blue colors respectively, to generate a desired color according to the persistence of vision of the human eyes, the desired color is same as the mixture of colors co-presented by three smaller transmissive pixels (those are red, green and blue pixels) each having the size as the reflective pixel.

Each of the reflective pixels 112, 113, and 114 has red, blue and green color filters because the environmental light required by the reflective pixel cannot emit the above-mentioned three-color light individually, the reflected environmental light need to passes through the red color filter, the blue color filter, and the green color filter such that reflective pixels 112, 113, and 114 respectively generate red, green and blue colors, and the desired color for the reflective pixel is generated by way of mixing.

The field sequential color technology originally applied to the transmissive LCD is restricted by the conventional problem that the transmissive region and the reflective region of the transflective LCD are driven by the same pixel voltage, so that the prior art method cannot be easily implemented in the transflective LCD.

Still referring to the pixel of the transflective display panel of FIG. 10, a frame scanning frequency of 60 Hz results in a scanning period of 16.67 ms for each frame. Therefore, when the transmissive pixel 111 and the reflective pixels 112, 113, and 114 display the same color, the transmissive pixel 111 sequentially finishes displaying the red, green and blue colors within 16.67 ms, and the displaying time of each color is only 5.56 ms (16.67/3). The reflective pixels 112, 113, and 114 respectively display the red, green and blue colors within the same 16.67 ms, so that the desired color can be generated by way of mixing. Because the transmissive pixel and the reflective pixel are independently driven by different pixel voltages, the field sequential color technology can be applied to the transflective LCD.

For example, a certain color is decomposed into three primary colors, respectively having gray levels of 30 for red, 50 for green and 100 for blue. The transmissive pixel 111 respectively displays the red, green and blue colors at a brightness corresponding to the gray levels of 30, 50, and 100 within |5|.56 ms, and the reflective pixels 112, 113 and 114 individually display a brightness corresponding to gray levels of 30, 50 and 100 within 16.67 ms.

In the transflective LCD panel of the illustrative embodiment, the transmissive pixel sequentially displays the red, green and blue colors in one frame time, and the three reflective pixels respectively display the red, green and blue colors in one frame time. Non-limiting, the transmissive pixel can display other colors, and the reflective pixel may also display other colors. Any transflective LCD panel having the transmissive pixel using field sequential color technology falls within the scope of this embodiment.

The invention further provides a transflective LCD that includes a backlight element and the transflective LCD panel of the fifth embodiment. The backlight element provides the backlight and is disposed in a manner similar to that of the transflective LCD according to the first embodiment of FIG. 4.

The transflective LCD panel according to this embodiment uses field sequential color technology in the transmissive pixels to increase the aperture rate of the liquid crystal panel and decrease the high cost of the color filter disposed in the transmissive pixel. Thus, it is possible to prevent the retained image generated when the frame changes severely, thus enhancing the display quality of the motion picture.

In the transflective LCD, the LCD module, and the LCD thereof, the transmissive pixel and the reflective pixel are respectively driven by the transmissive pixel voltage and the reflective pixel voltage. Independent control of the transmissive pixel and the reflective pixel enables the individual brightness or gray level of both pixels to attain a desired same level so that the image displaying quality can be enhanced. Furthermore, manufacturing costs may be reduced.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transflective liquid crystal display (LCD) device, comprising:
   a liquid crystal layer;
   a plurality of scan lines;
   a plurality of data lines;
   a plurality of pixel regions, each pixel region including at least one transmissive pixel and at least one reflective pixel, the at least one transmissive pixel and the at least one reflective pixel are connected to at least one data line and at least one scan line, and the at least one transmissive pixel is arranged side-by-side with the at least one reflective pixel;
   wherein a gap is disposed between the at least one transmissive pixel and the at least one reflective pixel of each pixel region, and each gap overlaps one of the plurality of scan lines; and
   wherein the at least one transmissive pixel and the at least one reflective pixel of a pixel region have different resolutions.

2. The transflective LCD device according to claim 1, wherein the transmissive pixels form a plurality of transmissive pixel rows and the reflective pixels form a plurality of reflective pixel rows, and the number of reflective pixel rows is smaller than the number of transmissive pixel rows.

3. The transflective LCD device according to claim 1, wherein the number of the reflective pixels is smaller than the number of the transmissive pixels.

4. The transflective LCD device according to claim 1, wherein the transflective LCD device has a single cell gap.

5. A transflective liquid crystal display (LCD) device, comprising:
   a liquid crystal layer;
   a plurality of scan lines;
   a plurality of data lines;
   a plurality of pixel regions, each pixel region including at least one transmissive pixel and at least one reflective pixel, the at least one transmissive pixel and the at least one reflective pixel are connected to at least one data line and at least one scan line, and the at least one transmissive pixel is arranged side-by-side with the at least one reflective pixel;
   wherein a gap is disposed between the at least one transmissive pixel and the at least one reflective pixel of each pixel region, and each gap overlaps one of the plurality of scan lines; and wherein the transmissive pixels form a plurality of transmissive pixel rows and the reflective pixels form a plurality of reflective pixel rows, and the number of reflective pixel rows is smaller than the number of transmissive pixel rows.

6. The transflective LCD device according to claim 5, wherein the number of the reflective pixels is smaller than the number of the transmissive pixels.

7. The transflective LCD device according to claim 5, wherein the transflective LCD device has a single cell gap.

8. A transflective liquid crystal display (LCD) device, comprising:
   a liquid crystal layer;
   a plurality of scan lines;
   a plurality of data lines;
   a plurality of pixel regions, each pixel region including at least one transmissive pixel and at least one reflective pixel, the at least one transmissive pixel and the at least one reflective pixel are connected to at least one data line and at least one scan line, and the at least one transmissive pixel is arranged side-by-side with the at least one reflective pixel;
   wherein a gap is disposed between the at least one transmissive pixel and the at least one reflective pixel of each pixel region, and each gap overlaps one of the plurality of scan lines; and
   wherein the number of the reflective pixels is smaller than the number of the transmissive pixels.

9. The transflective LCD device according to claim 8, wherein the transflective LCD device has a single cell gap.

\* \* \* \* \*